(12) United States Patent
Dross et al.

(10) Patent No.: US 10,761,308 B2
(45) Date of Patent: Sep. 1, 2020

(54) COLOR CORRECTING COLLIMATION OF LIGHT FROM A COLOR OVER POSITION LIGHT SOURCE

(71) Applicant: SIGNIFY HOLDING B.V., Eindhoven (NL)

(72) Inventors: Oliver Dross, Eindhoven (NL); Fetze Pijlman, Eindhoven (NL); Hendrikus Hubertus Petrus Gommans, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 39 days.

(21) Appl. No.: 15/548,323

(22) PCT Filed: Jan. 26, 2016

(86) PCT No.: PCT/EP2016/051578
§ 371 (c)(1),
(2) Date: Aug. 2, 2017

(87) PCT Pub. No.: WO2016/124449
PCT Pub. Date: Aug. 11, 2016

(65) Prior Publication Data
US 2018/0024337 A1 Jan. 25, 2018

(30) Foreign Application Priority Data
Feb. 5, 2015 (EP) ..................... 15153895

(51) Int. Cl.
*G02B 19/00* (2006.01)
*F21K 9/62* (2016.01)
*F21Y 115/10* (2016.01)

(52) U.S. Cl.
CPC ............ *G02B 19/0028* (2013.01); *F21K 9/62* (2016.08); *G02B 19/0061* (2013.01); *F21Y 2115/10* (2016.08)

(58) Field of Classification Search
CPC ... G02B 19/0028; G02B 19/0061; F21K 9/62; F21V 7/09
(Continued)

(56) References Cited

U.S. PATENT DOCUMENTS 4,962,450 A * 10/1990 Reshetin ............. F21S 48/1329
362/268
2009/0219716 A1 9/2009 Weaver et al.
(Continued)

FOREIGN PATENT DOCUMENTS

CN 103292247 A 9/2013
EP 2276076 A1 1/2011
(Continued)

OTHER PUBLICATIONS

C.R. Prins, et al., "An Inverse Method for the Design of TIR Collimators to Achieve a Uniform Color Light Beam", Eindhoven University of Technology, Department of Mathematics and Computer Science, Centre for Analysis, Scientific Computer Science (CASA), undated, pp. 1-23.
(Continued)

*Primary Examiner* — Travis S Fissel
(74) *Attorney, Agent, or Firm* — Akarsh P. Belagodu

(57) ABSTRACT

A collimator (3) for a color over position light source (2) is provided. The collimator (3) comprises a focal point (F), an optical axis (OA) containing the focal point (F), an imaging element (4) arranged around or on the optical axis (OA) and several light spreading elements (5, 11, 12) ranged around the optical axis (OA) to receive at least one image from the imaging element (4). The light spreading elements (5, 11, 12) have different light beam widening characteristics, the light beam widening characteristics of each light spreading element (5, 11, 12) of said light spreading elements (5, 11, 12) depending on the position of the light spreading element (5, 11, 12) relative to the focal point (F). The light spreading elements (5, 11, 12) are adapted to spread light striking the light spreading elements (5, 11,12) in a first plane (M) including the optical axis (OA). A method for collimating
(Continued)

light from a color over position light source (2) is also provided.

13 Claims, 4 Drawing Sheets

(58) Field of Classification Search
USPC ............ 359/634; 362/237, 296.05, 297, 298, 362/296.1, 296.09
See application file for complete search history.

(56) References Cited

U.S. PATENT DOCUMENTS

| | | |
|---|---|---|
| 2011/0012147 A1 | 1/2011 | Bierhuizen et al. |
| 2011/0018016 A1 | 1/2011 | Bierhuizen et al. |
| 2012/0268949 A1* | 10/2012 | Parkyn .................... F21V 5/04 362/327 |
| 2013/0058103 A1* | 3/2013 | Jiang ......................... F21V 5/04 362/296.05 |

FOREIGN PATENT DOCUMENTS

| | | |
|---|---|---|
| WO | WO2013035036 A1 | 3/2013 |
| WO | WO2013160802 A1 | 10/2013 |

OTHER PUBLICATIONS

C. Prins, et al., "An Inverse Method for Color Uniformity in White LED Spotlights", Journal of Mathematics in Industry 2014, 4:5, pp. 1-19.

C. Prins, et al., "Freeform TIR Collimators for the Removal of Angular Color Variation in White LED Spotlights", by SPIE Proceedings, Jul. 29, 2014, vol. 8834, pp. 1-2.

* cited by examiner

COLOR CORRECTING COLLIMATION OF LIGHT FROM A COLOR OVER POSITION LIGHT SOURCE

CROSS-REFERENCE TO PRIOR APPLICATIONS

This application is the U.S. National Phase application under 35 U.S.C. § 371 of International Application No. PCT/EP2016/051578, filed on Jan. 26, 2016, which claims the benefit of European Patent Application No. 15153895.6, filed on Feb. 5, 2015. These applications are hereby incorporated by reference herein.

TECHNICAL FIELD

The present invention relates to a collimator for a color over position light source, a lighting device comprising a collimator, and an associated method.

BACKGROUND

Many applications require light sources that emit uniformly white light. Some light sources provide white light through the mixing of light of different colors. In practice, light emitted by these types of light sources is often not uniformly white in the far field where the light source appears as a point source, and various techniques for color correction are known in the art. WO 2013/035036 A1, for example, discloses collimators having rotationally symmetric surface segments designed to correct so-called "color over angle" (CoA) variation. In short, CoA variation results from the color of the emitted light being dependent on the angle of emission.

Another example of an undesirable color variation that may occur is known as "color over position" (CoP) which refers to situations where the color of the emitted light depends on the position of emission on the light source. It is possible to use collimators for reducing CoP variation, but different technical requirements have to be met compared with the case of CoA variation.

SUMMARY

It would be advantageous to provide an improved or alternative collimator capable of reducing undesirable color variations in the far field light from a light source. An aspect of particular interest is the capability of the collimator to correct CoP variation.

To better address this concern, in a first aspect of the invention there is presented a collimator for a CoP light source. The collimator comprises: a focal point (F), an optical axis containing the focal point (F), an imaging element arranged around or on the optical axis, and several light spreading elements arranged around the optical axis to receive at least one image from the imaging element. The light spreading elements have different light beam widening characteristics, and the light beam widening characteristics of each light spreading element of said light spreading elements depend on the position of the light spreading elements relative to the focal point (F). The light spreading elements are adapted to spread light striking the light spreading elements in a first plane that includes the optical axis.

By a "CoP light source" is meant a light source that has CoP variation. That is to say, the color of the light emitted by the light source depends on the position on the light source from which the light is emitted.

Providing the collimator with position dependent light spreading elements on which an imaging element forms at least one image improves the mixing of light having different colors and may thus reduce undesirable color variations in the far field light from a CoP light source.

In one embodiment, the imaging element is configured for one dimensional imaging. According to another embodiment, the imaging element is configured for two dimensional imaging. Depending on the technical requirements of the intended application or for cost reasons, one type of imaging element may be preferred over the other.

The light beam widening characteristics of each light spreading element may depend on an optical path length measured from the focal point to the light spreading element. The light beam widening characteristics of each light spreading element may depend on the orthogonal distance from the optical axis to the light spreading element. Collimators often have such shapes that these types of position dependence results in a good mixing of light of different colors in the far field.

In one embodiment, the light spreading elements are adapted to spread light striking the light spreading elements in both the first plane and a second plane which is orthogonal to the first plane and which has a normal that is orthogonal to the optical axis. Spreading the light in two planes, rather than in only one plane, may improve the mixing of light of different colors in the far field.

In one embodiment, the light spreading elements are microlenses or facets. In some embodiments, the light spreading elements are diffusive elements. These types of light spreading elements are easily manufactured to have the light beam widening characteristics required for a particular application.

In one embodiment, the light spreading elements are adapted to spread light striking the light spreading elements so that light beams having struck different light spreading elements are equally spread out in space. Such light spreading elements help to ensure that light of no particular color dominates in the far field.

In one embodiment, the light spreading elements are provided on a light redirecting surface of the collimator. Such a collimator is especially suitable for applications with a mid-power light emitting diodes.

In one embodiment, the light spreading elements are provided on a light exit surface of the collimator.

In one embodiment, the collimator comprises a first lens and a second lens, the imaging element being formed by the first lens and the light spreading elements being provided on the second lens. Such a collimator is especially suitable for applications with a large number of light sources and can be manufactured using a relatively small amount of material. The second lens may provide a large area for beam deflection and make the collimator have a uniform appearance.

In a second aspect of the invention, there is presented a lighting device which comprises a collimator according to the first aspect and a color over position light source arranged on the focal point of the collimator so that light from the light source is received by the collimator.

The second aspect may have features and technical effects which are identical or similar to those of the first aspect, and vice versa.

In a third aspect of the invention, there is presented a method for collimating light emitted by a color over position light source. The method comprises: providing a collimator as described above, arranging the light source on the focal point of the collimator, and operating the light source. During operation of the light source, at least one image of the light source is received by the light spreading elements from the imaging element, and the light striking the light spreading elements is spread in a first plane including the optical axis.

The third aspect may have features and technical effects which are identical or similar to those of the first aspect, and vice versa.

It is noted that the invention relates to all possible combinations of features recited in the claims.

BRIEF DESCRIPTION OF THE DRAWINGS

This and other aspects of the present invention will now be described in more detail, with reference to the appended drawings.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION OF EMBODIMENTS

Currently preferred embodiments of the present invention will now be described more fully hereinafter with reference to the accompanying drawings. This invention may, however, be embodied in many different forms and should not be construed as limited to the embodiments set forth herein; rather, these embodiments are provided for thoroughness and completeness, and fully convey the scope of the invention to the skilled person.

Figure 1:
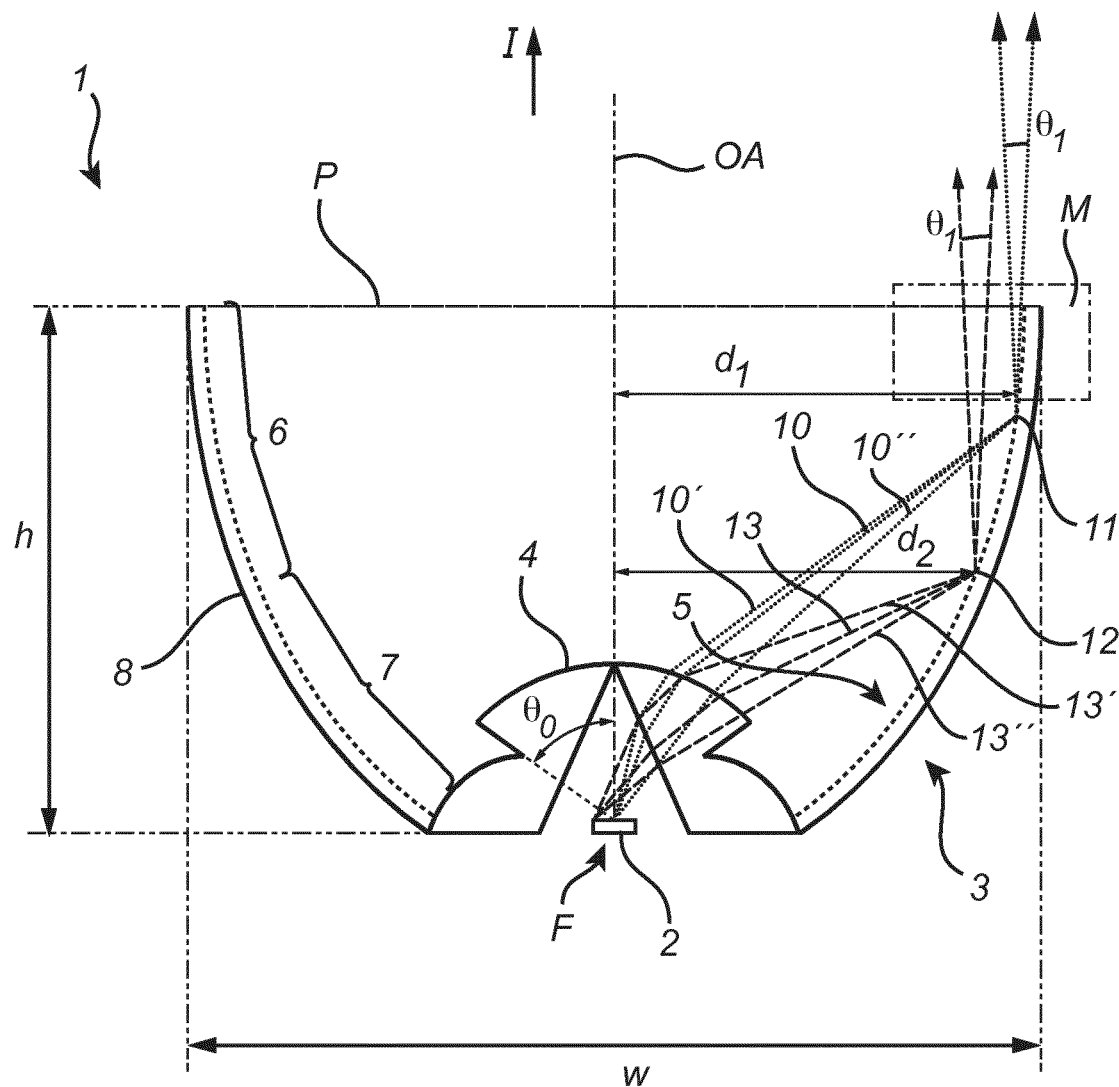
FIG. 1 shows a schematic cross sectional side view of an embodiment of a lighting device which includes a collimator and a light source.
Figure 2:
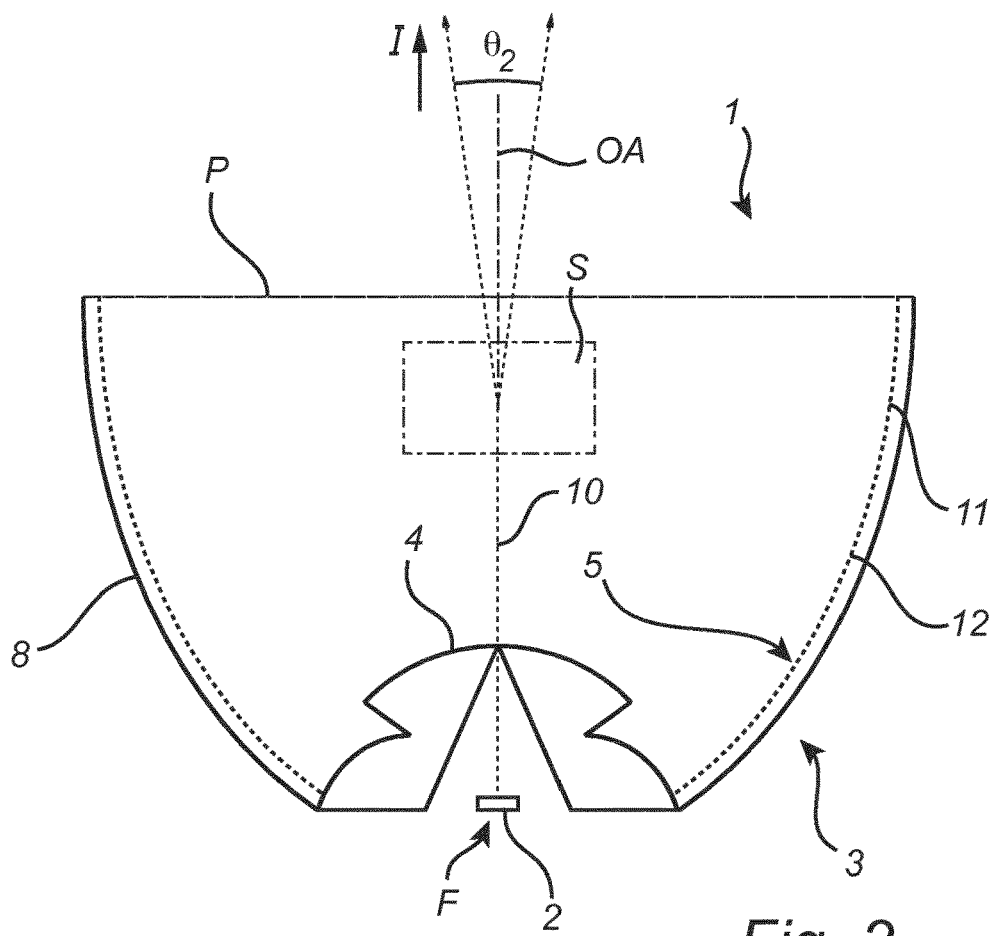
FIG. 2 shows another schematic cross sectional view of the lighting device in FIG. 1. The lighting device has been rotated by 90 degrees about the optical axis relative to FIG. 1.
Figure 3:
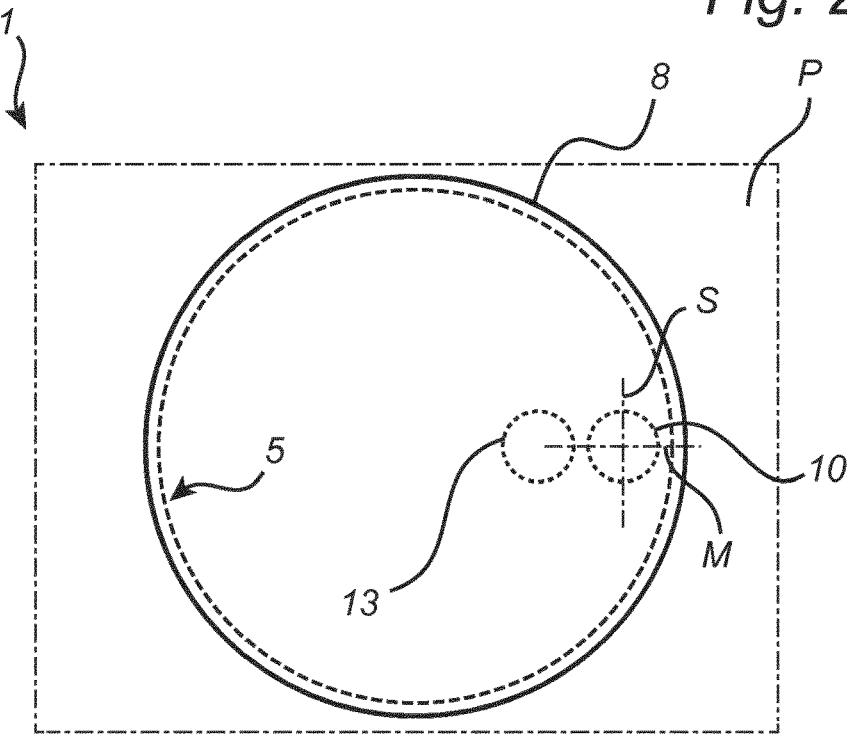
FIG. 3 shows a schematic top view of the lighting device in FIG. 1.

FIGS. 1 to 3 show a lighting device 1 having a CoP light source 2 and a collimator 3. The lighting device 1 can for example be a spot lamp.

The collimator 3 is configured to collimate light from the light source 2 into light beams propagating in the general direction of illumination I of the lighting device 1. The height h and the width w of the collimator 3 are typically much greater than the extension of the light source 2 in any direction. The height h is typically between 10 mm and 100 mm. The width can be about 5 to 20 times a diameter of the light source 2. The light source 2 is arranged on a focal point (F) and an optical axis OA of the collimator 3, the optical axis OA being a central axis of the collimator 3 and parallel with the general direction of illumination I. The light source 2 is arranged so that light emitted by the light source 2 is received by the collimator 3. More precisely, light emitted by the light source 2 is received by an imaging element 4 arranged around the optical axis OA. In this embodiment, the imaging element 4 is circular symmetric and centered on the optical axis OA. The imaging element 4 is configured to form two images of the light source 2. In other embodiments, the imaging element 4 may be configured to form only one image or more than two images, the most appropriate number of images depending on a number of factors such as the size and geometry of the collimator 3. The imaging element 4 can be configured for two dimensional imaging or for one dimensional imaging. The images formed by the imaging element 4 are magnified. The magnification factor depend on, among other things, the number of images, the size of the light source 2 and the size of the light spreading elements 5 (see below), but can for example be 2, 2.5 or 3. The imaging element 4 can for example be made of polycarbonate, silicone or cyclic olefin copolymers. Other possible materials are acrylates, such as poly(methyl methacrylate). The imaging element 4 can be made of glass or plastics.

Several light spreading elements 5 are arranged around the optical axis OA to receive the two images formed by the imaging element 4 by deflecting light from the light source 2. The imaging element 4 is thus configured to focus the two images of the light source 2 on the light spreading elements 5, typically so that the full images fall onto the light spreading elements 5. The imaging element 4 generates a first image on a first set of light spreading elements 6 and a second image on a second set of light spreading elements 7, the first set 6 being located further from the optical axis OA and the light source 2 than the second set 7. The first image is formed by light emitted from the light source 2 at an angle smaller than $\theta_0$ with respect to the optical axis, and a second image is formed by light emitted at an angle larger than $\theta_0$.

The light beam spreading elements 5 have light beam widening characteristics which are position dependent, meaning that the light beam widening characteristics of a specific light spreading element depend on the position of the light spreading element relative to the focal point F. More specifically, the light beam widening characteristics of each light spreading element depend on the optical path length measured from the focal point F to the light spreading element. In this embodiment, this dependence is such that the light beam widening characteristics of each light spreading element depend on the orthogonal distance from the optical axis to the light spreading element, but that may or may not be the case in other embodiments. The light spreading elements 5 can be adapted to spread light by for example reflection and/or refraction. Examples of light spreading elements 5 include microlenses and facets, the light beam widening characteristics of a light spreading element 5 then being determined by the curvature of the microlens or facet. The light spreading elements 5 typically have sizes in the range from 10 microns to a few millimeters. Materials that the light spreading elements 5 can be made of include metals, such as aluminum, and metalized plastics.

Each of the light spreading elements 5 is adapted to spread incident light in a first plane M, which will henceforth be referred to as the meridian plane M. Each of the light spreading elements 5 may also be adapted to spread incident light in a second plane S, which will henceforth be referred to as the sagittal plane S. The meridian plane M of a light spreading element is a plane that contains the light spreading element and the optical axis OA. The sagittal plane S of a light spreading element contains the light spreading element, is orthogonal to the meridian plane M and has a normal that is orthogonal to the optical axis OA.

The light spreading elements 5 are provided on a light redirecting surface 8, such as a reflective surface formed by a mirror. The light redirecting surface 8 is curved so that incident light is generally redirected in the general direction of illumination I. The light redirecting surface 8 surrounds the optical axis OA and is circular symmetric with respect to the optical axis OA. The orthogonal distance from the optical axis OA to the light redirecting surface 8 increases in the general direction of illumination I of the lighting device 1. The front edge of the light redirecting surface 8 defines a light exit plane P which is perpendicular to the optical axis OA and which is the plane through which light passes upon leaving the collimator 3.

Figure 4:
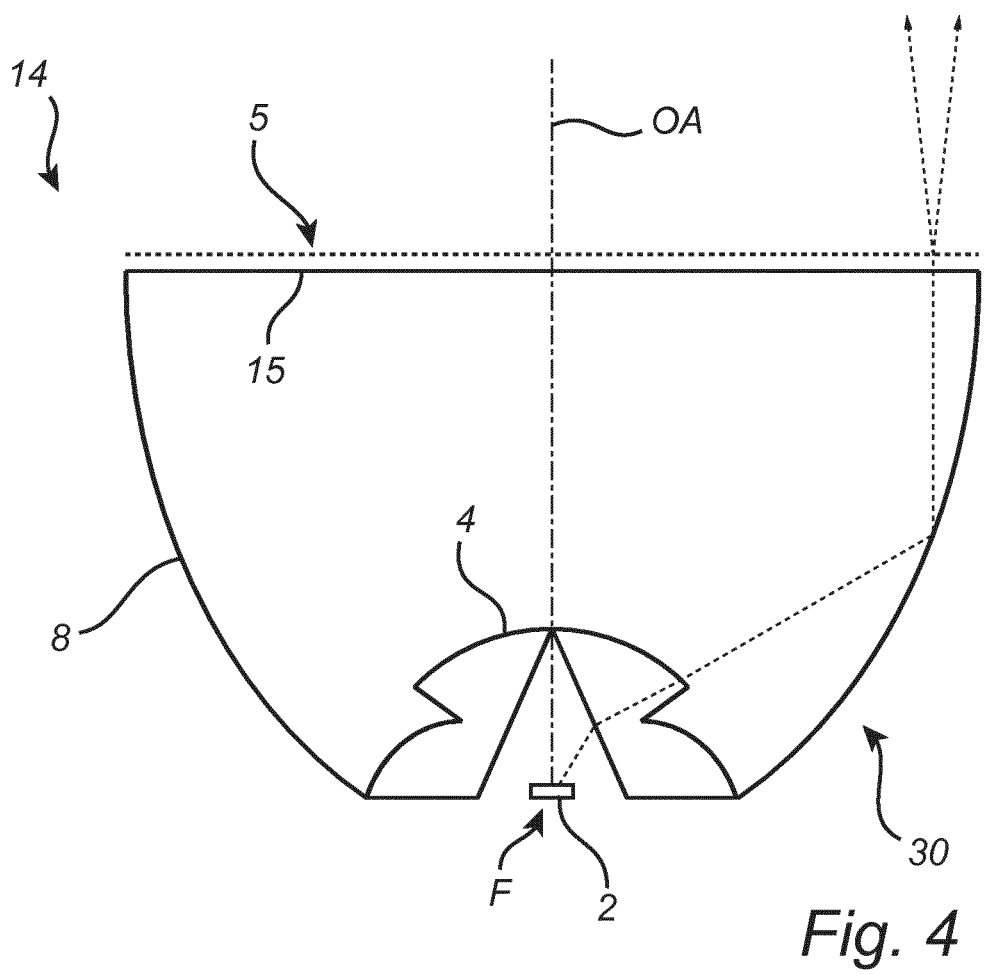
FIG. 4 shows a schematic cross sectional side view of an alternative embodiment of a lighting device which includes a collimator and a light source.

FIG. 4 shows an embodiment of a lighting device 14 which is similar to the one discussed above in connection with FIG. 2. In this embodiment, however, the light spreading elements 8 are provided on the light exit surface 6 of the collimator 30. The light spreading elements 8 can be formed in one piece with the light exit surface 15 or be integrated with of a separate part, such as a plate, which is attached on the light exit surface 15. In some embodiments, the light spreading elements 8 are adapted to diffuse light, for example through diffusion by transmission or diffusion by metallic reflection.

Figure 5:
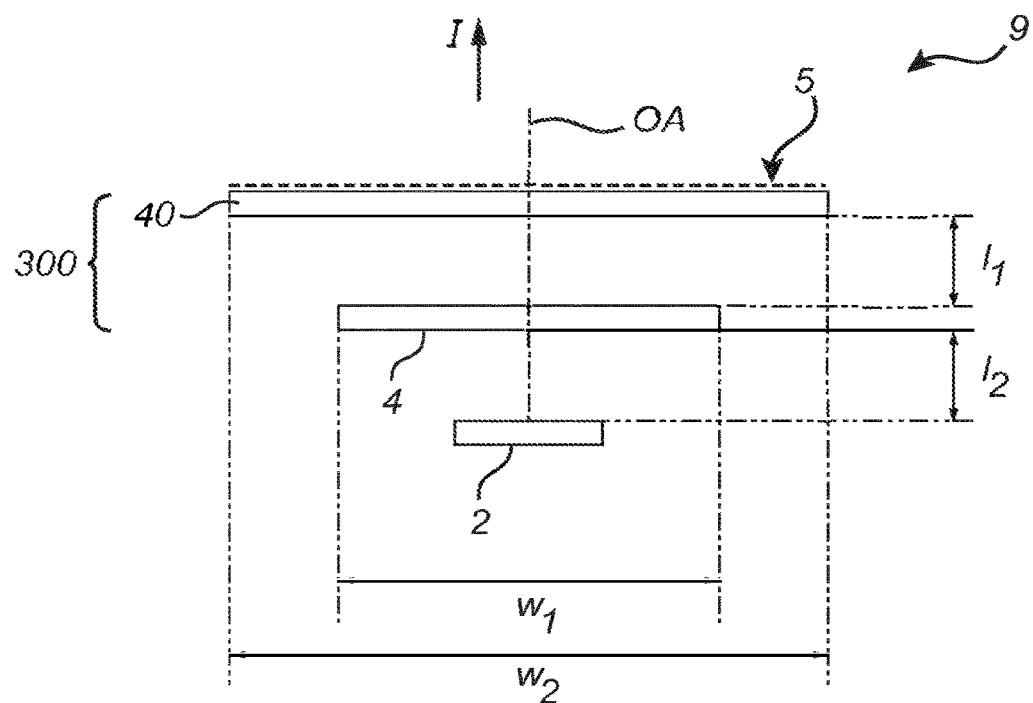
FIG. 5 shows a schematic cross sectional side view of yet another alternative embodiment of a lighting device which includes a collimator and a light source.

FIG. 5 shows an embodiment of a lighting device 9 which is similar to the one discussed above in connection with FIGS. 2 and 3. In this embodiment, however, the collimator 300 comprises a first lens 4, which forms the imaging element, and a second lens 40 which is provided with the light spreading elements 5. In this embodiment, the first lens 4 is configured to form one magnified image of the light source 2 on the second lens 40, but the first lens 4 may be configured to form two or more images in other embodiments. The first lens 4 can for example be a plano convex element or a Fresnel lens. The second lens 40 can be a rotationally symmetric collimating lens. The second lens 40 can be a freeshape Fresnel lens which allows the direction and spread of light from each point of the light exit surface of the lens to be controlled independently, the light spreading elements then being formed in one piece with the second lens 40. The first and second lenses 4, 40 are arranged orthogonal to the optical axis OA and parallel to each other a distance l1 apart. The distance l1 is usually in the millimeter or centimeter range. The distance l2 between the first lenses 4 and the light source 2 is typically a couple of centimeters. The width $w_1$ of the first lens 4 is usually smaller than the width $w_2$ of the second lens 10. The widths $w_1$ and $w_2$ are typically in the millimeter or centimeter range.

Figure 6:
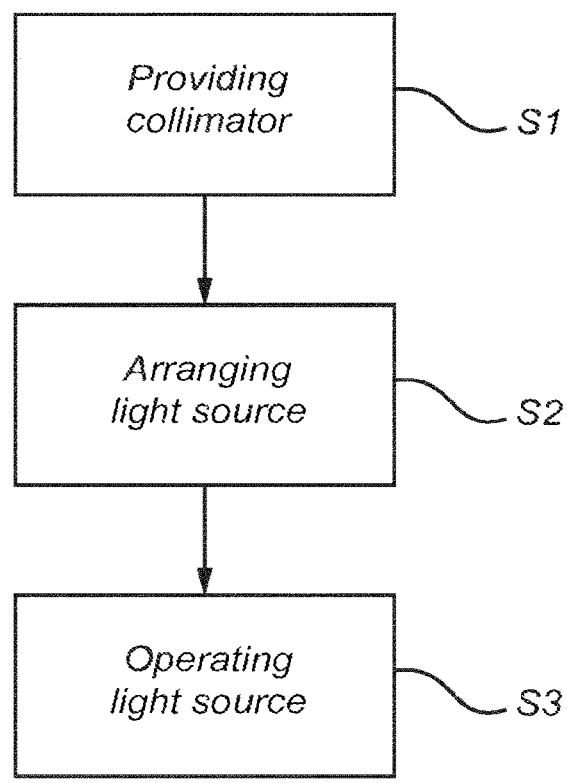
FIG. 6 is a flowchart of some of the steps of a method for collimating light from a CoP light source.

FIG. 6 is a flowchart of some of the steps of a method for collimating light from a color over position light source 2. At step S1, a collimator 3 similar to the ones discussed above in connection with FIGS. 2 to 4 is provided. At step S2, a CoP light source 2 is arranged on the optical axis of the collimator. At step S3, the light source is put into operation.

The operation of an embodiment of the invention will be described below with reference to FIGS. 2 to 4. By activating the light source 2, the light source 2 emits light that is received by the collimator 3 by striking the imaging element 4. In each image formed on the light spreading elements 5 by the imaging element 4, light of different colors are spatially separated so that each light spreading element 5 does not receive light of all the colors emitted by the light source 2. Without the imaging element 4, each light spreading element 5 would receive light from all positions on the light source where light is emitted. Each light spreading element 5 would thus have received light of all the colors emitted by the light source 2 (due to CoP variation). For some applications, it is sufficient that the separation of colors be partial in the sense that the colors are only separated in one spatial direction (in which case the imaging element 4 is configured for one dimensional imaging) or in two spatial directions (in which case the imaging element 4 is configured for two dimensional imaging). In the one dimensional case, the colors of a light beam are separated in a meridian plane. In the two dimensional case, the colors of a light beam are separated in both a meridian plane and a sagittal plane.

Due to the imaging element's 4 separation of colors, a first light spreading element 11 receives light of a slightly different color than a second light spreading element 12 which is located closer to the light source 2 than the first light spreading element 11. The orthogonal distance between the first light spreading element 11 and the optical axis OA is $d_1$, and the orthogonal distance between the second light spreading element 12 and the optical axis OA is $d_2$. The first light spreading element 11 is struck by a first light beam 10 which is thereby redirected towards the general direction of illumination I and spread in the meridian plane M, and optionally also in the sagittal plane S, of the first light spreading element 11. Similarly, a second light beam 13 strikes the second light spreading element 12, whereby the second light beam 13 is redirected towards the general direction of illumination I and spread in the meridian plane, and optionally also in the sagittal plane, of the second light spreading element 12. The first light spreading element 11 spreads the first light beam 10 so that it covers an angle $\theta_1$ in the meridian plane M. The second light spreading element 12 spreads the second light beam 13 so that it covers an angle $\theta_1$ in the meridian plane of the second light spreading element 12. The angles covered by the first and second light beams 10, 13 in their respective meridian planes are equal, or approximately equal.

Rays 11' and 11" illustrate imaging of the center of the light source 2, and rays 13' and 13" illustrate imaging of the edge of the light source 2, i.e. different positions of the light source 2 emitting different colors.

In those embodiments in which the first and second light spreading elements 11, 12 are adapted to spread light in their respective meridian planes and in their respective sagittal planes, the first and second light beams 10, 13 are spread in the following way. The first light spreading element 11 spreads the first light beam 10 so that it covers an angle $\theta_1$ in the meridian plane M and an angle $\theta_2$ in the sagittal plane S. The second light spreading element 12 spreads the second light beam 13 so that it covers an angle $\theta_1$ in the meridian plane of the second light spreading element 12 and an angle $\theta_2$ in the sagittal plane of the second light spreading element 12. The angles $\theta_1$ and $\theta_2$ may or may not be the same, but the angles covered by the first and second light beams 10, 13 in their respective meridian planes are equal, or approximately equal, and the angles covered by the first and second light beams 10, 13 in their respective sagittal planes are equal, or substantially equal.

Upon leaving the collimator 3, the first and second light beams 10, 13 are thus oriented approximately parallel with the optical axis OA and are about equally spread out in space. By way of explanation, it should be noted that the light spreading elements 5 spread light beams by creating a respective focal point via a curved surface, wherein light spreading elements 5 having different focal points spread incident light beams differently. This is similar to how lenses work. Further, the greater distance from a light spreading element to the light source 2, the smaller the light source 2 "appears" to the light spreading element. Consequently, had the light beam widening characteristics of the light spreading elements 5 not been position dependent, a light beam leaving the first light spreading element 11 would have been wider than a light beam leaving the second light spreading element 12. The stronger light beam widening characteristics of the first light spreading element 11 compensate for the greater distance so that the widths of the first and second light beams 10, 13 match each other in the collimated light, whereby the color of one of the light beams does not dominate over the other in the far field.

The person skilled in the art realizes that the present invention by no means is limited to the preferred embodiments described above. On the contrary, many modifications and variations are possible within the scope of the appended claims Variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A lighting device, comprising a collimator for a color over position light source, the collimator comprising:
    a focal point;
    an optical axis containing the focal point;
    an imaging element arranged around or on the optical axis, wherein the imaging element is configured to form at least one image of the light source; and
    several light spreading elements having a first set of light spreading elements and a second set of light spreading elements, the first set of light spreading elements being located further from the optical axis and the light source than the second set of light spreading elements, arranged around the optical axis to receive said at least one image from the imaging element,
    wherein the imaging element is configured to focus a first image on the first set of light spreading elements and focus a second image on the second set of light spreading elements, the first image formed by light emitted from the light source at an angle smaller than $\theta_0$ with respect to the optical axis, and the second image being formed by light emitted at an angle larger than $\theta_0$,
    wherein the light spreading elements have different light beam widening characteristics, the light beam widening characteristics of each light spreading element of said light spreading elements depending on the position of the light spreading element relative to the focal point, and wherein the light spreading elements are adapted to spread light striking the first set of light spreading elements and the second set of light spreading elements in a first plane including the optical axis in such a way that the beam widening characteristics enable the first image and the second image to be spread over a substantially equal angle $\theta_1$,
    wherein the lighting device further comprises the color over position light source arranged on the focal point of the collimator so that light from the light source is received by the collimator.

2. The lighting device according to claim 1, wherein the imaging element is configured for separating colors of a light beam of the light source in the first plane.

3. The lighting device according to claim 1, wherein the imaging element is configured for two dimensional imaging.

4. The lighting device according to claim 1, wherein the light beam widening characteristics of each light spreading element depend on an optical path length measured from the focal point to the light spreading element.

5. The lighting device according to claim 1, wherein the light beam widening characteristics of each light spreading element depend on the orthogonal distance from the optical axis to the light spreading element.

6. The lighting device according to claim 1, wherein the light spreading elements are adapted to spread light striking the light spreading elements in both the first plane and a second plane, the second plane being orthogonal to the first plane and having a normal orthogonal to the optical axis.

7. The lighting device according to claim 1, wherein the light spreading elements are adapted to spread light striking the light spreading elements so that light beams having struck different light spreading elements are equally spread out in space.

8. The lighting device according to claim 1, wherein the light spreading elements are provided on a light redirecting surface of the collimator.

9. The lighting device according to claim 1, wherein the light spreading elements are provided on a light exit surface of the collimator.

10. The lighting device according to claim 1, wherein the collimator comprises a first lens and a second lens, the imaging element being formed by the first lens and the light spreading elements being provided on the second lens.

11. The lighting device according to claim 1, wherein the imaging element is configured to form at least two magnified images of the light source, including a first image generated on a first set of light spreading elements and a second image generated on a second set of light spreading elements, the first set of light spreading elements being located further from the optical axis and the light source than the second set of light spreading elements.

12. A method for collimating light from a color over position light source, the method comprising:
    providing a collimator including:
    a focal point;
    an optical axis containing the focal point;
    an imaging element arranged around or on the optical axis, wherein the imaging element is configured to form at least one image of the light source; and
    several light spreading elements having a first set of light spreading elements and a second set of light spreading elements, the first set of light spreading elements being located further from the optical axis and the light source than the second set of light spreading elements, arranged around the optical axis to receive said least one image from the imaging element,
    wherein the imaging element is configured to focus a first image on the first set of light spreading elements and focus a second image on the second set of light spreading elements, the first image being formed by light emitted from the light source at an angle smaller than $\theta_1$ respect to the optical axis, and the second image being formed by light emitted at an angle larger than $\theta_1$,
    wherein the light spreading elements have different light beam widening characteristics, the light beam widening characteristics of each light spreading element of said light spreading elements depending on the position of the light spreading element relative to the focal point, and
    wherein the light spreading elements are adapted to spread light striking the first set light spreading elements and the second set of light spreading elements in a first plane including the optical axis in such a way that the beam widening characteristics enable the first image and the second image to be spread over a substantially equal angle $\theta_1$;

arranging the light source on the focal point of the collimator; and operating the light source, whereby the light spreading elements receive said at least one image of the light source from the imaging element, and whereby light striking the light spreading elements is spread in a first plane including the optical axis.

13. A lighting device, comprising a collimator for a color over position light source, the collimator comprising:

a focal point;

an optical axis containing the focal point;

an imaging element arranged around or on the optical axis, wherein the imaging element is configured to focus a first image of the light source onto a first set of light spreading elements and focus a second image of the light source onto a second set of light spreading elements, wherein the first set of light spreading elements and the second set of light spreading elements are arranged around the optical axis and receive said light at a first angle and said light at a second angle from the imaging element, wherein the light spreading elements have different light beam widening characteristics, the light beam widening characteristics of each light spreading element of said light spreading elements depending on the position of the light spreading element relative to the focal point, wherein the lighting device further comprises the color over position light source arranged on the focal point of the collimator so that light from the light source is received by the collimator.

* * * * *